United States Patent
Kang et al.

(10) Patent No.: US 10,168,104 B2
(45) Date of Patent: Jan. 1, 2019

(54) FILLING PIPE FOR USE IN HIGH-TEMPERATURE HEAT PIPE FILLING OPERATION

(71) Applicant: TAMKANG UNIVERSITY, Taipei County (TW)

(72) Inventors: Shung-Wen Kang, Taipei (TW); Kun-Cheng Chien, Nantou (TW)

(73) Assignee: TAMKANG UNIVERSITY, Taipei County (TW)

( * ) Notice: Subject to any disclaimer, the term of this patent is extended or adjusted under 35 U.S.C. 154(b) by 168 days.

(21) Appl. No.: 15/191,971

(22) Filed: Jun. 24, 2016

(65) Prior Publication Data
US 2017/0370653 A1   Dec. 28, 2017

(51) Int. Cl.
F28D 15/02   (2006.01)

(52) U.S. Cl.
CPC ...... F28D 15/0283 (2013.01); B23P 2700/09 (2013.01)

(58) Field of Classification Search
CPC ... F28D 15/0283; B23P 15/26; B23P 2700/09
USPC .......................................................... 141/59
See application file for complete search history.

(56) References Cited

U.S. PATENT DOCUMENTS

| | | | | |
|---|---|---|---|---|
| 4,106,171 A * | 8/1978 | Basiulis | .................. | F16L 55/10 165/104.21 |
| 6,230,407 B1 * | 5/2001 | Akutsu | ............... | F28D 15/0233 29/890.03 |
| 7,591,121 B2 * | 9/2009 | Lin | ..................... | F28D 15/0283 53/127 |
| 2004/0221905 A1 * | 11/2004 | Luo | ..................... | F16L 55/1141 138/89 |

* cited by examiner

Primary Examiner — P. Macade Nichols
(74) Attorney, Agent, or Firm — WPAT, PC

(57) ABSTRACT

A filling pipe for use in high-temperature heat pipe filling operation includes an alkali metal filling unit, metallic pipe fixing unit, hermetic seal cover and stopping net. The alkali metal filling unit has a filling body, a receiving space disposed in the filling body. A feed inlet and a feeding pipe are disposed at the top and bottom of the filling body, respectively. A vacuum-generating component is disposed at the filling body laterally. The metallic pipe fixing unit has a fixing body and a taper opening disposed thereon and adapted to limit the metallic pipe. When the fixing body gets connected to the filling body, the feeding pipe is inserted into metallic pipe. The hermetic seal cover covers separably the feed inlet. The stopping net is movably disposed in the receiving space. Therefore, solid alkali metals are filled into a metallic pipe easily and safely.

12 Claims, 3 Drawing Sheets

FILLING PIPE FOR USE IN HIGH-TEMPERATURE HEAT PIPE FILLING OPERATION

FIELD OF THE INVENTION

The present invention relates to filling pipes and, more particularly, to a filling pipe for use in high-temperature heat pipe filling operation to enable filling workers to fill solid alkali metals into a metallic pipe easily and safely in order to manufacture a high-temperature heat pipe.

BACKGROUND OF THE INVENTION

Low-temperature, moderate-temperature and high-temperature heat pipes vary from each other in terms of the conventional cooling materials they are filled with. For example, low-temperature heat pipes are filled with water and applied to an ambient temperature below 100° C. Moderate-temperature heat pipes are for use at an ambient temperature of 200~500° C. High-temperature heat pipes are for use at an ambient temperature above 500° C. Therefore, the cooling materials for filling high-temperature heat pipes are preferably alkali metals, such as metallic lithium, metallic sodium, and metallic potassium.

With alkali metals being of a low density, a low melting point and a low boiling point, alkali metals usually exhibit high activity capacity under a normal condition. If alkali metals are filled into a metallic pipe to manufacture a high-temperature heat pipe, the alkali metals will be likely to undergo chemical reactions upon exposure to air or water and therefore explode, thereby injuring filling workers.

Therefore, it is important to provide a filling pipe for use in high-temperature heat pipe filling operation to enable filling workers to fill solid alkali metals into a metallic pipe easily and safely in order to manufacture a high-temperature heat pipe.

SUMMARY OF THE INVENTION

In view of the aforesaid drawbacks of the prior art, it is an objective of the present invention to provide a filling pipe for use in high-temperature heat pipe filling operation to enable filling workers to fill solid alkali metals into a metallic pipe easily and safely in order to manufacture a high-temperature heat pipe.

In order to achieve the above and other objectives, the present invention provides a filling pipe for use in high-temperature heat pipe filling operation to fill a plurality of solid alkali metals into a metallic pipe, wherein one end of the metallic pipe has an opening. The filling pipe comprises an alkali metal filling unit, a metallic pipe fixing unit, a hermetic seal cover and a stopping net.

The alkali metal filling unit has: a filling body; a receiving space disposed in the filling body; a feed inlet disposed at the top of the filling body and in communication with the receiving space; a feeding pipe disposed at the bottom of the filling body and in communication with the receiving space; a first connecting portion disposed at the bottom of the filling body; and a vacuum-generating component disposed at the filling body and in communication with the receiving space.

The metallic pipe fixing unit has: a fixing body; a taper opening disposed at the bottom of the fixing body and adapted to limit the opening-disposed end of the metallic pipe; and a second connecting portion disposed at the top of the fixing body and connected to the first connecting portion, wherein, when the first connecting portion gets connected to the second connecting portion, the feeding pipe of the alkali metal filling unit is inserted into the opening-disposed end of the metallic pipe.

The hermetic seal cover separably covers the feed inlet of the alkali metal filling unit. The stopping net is movably disposed in the receiving space of the alkali metal filling unit.

Regarding the filling pipe, the first connecting portion and the second connecting portion are connected to each other by screwing.

Regarding the filling pipe, when the feeding pipe of the alkali metal filling unit is inserted into the opening-disposed end of the metallic pipe, an opening of the feeding pipe fits the opening of the metallic pipe tightly.

Regarding the filling pipe, the hermetic seal cover separably covers the feed inlet of the alkali metal filling unit by screwing.

Regarding the filling pipe, the alkali metals are metallic sodium.

In conclusion, the present invention provides a filling pipe for use in high-temperature heat pipe filling operation to enable filling workers to fill solid alkali metals into a metallic pipe easily and safely in order to manufacture a high-temperature heat pipe.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
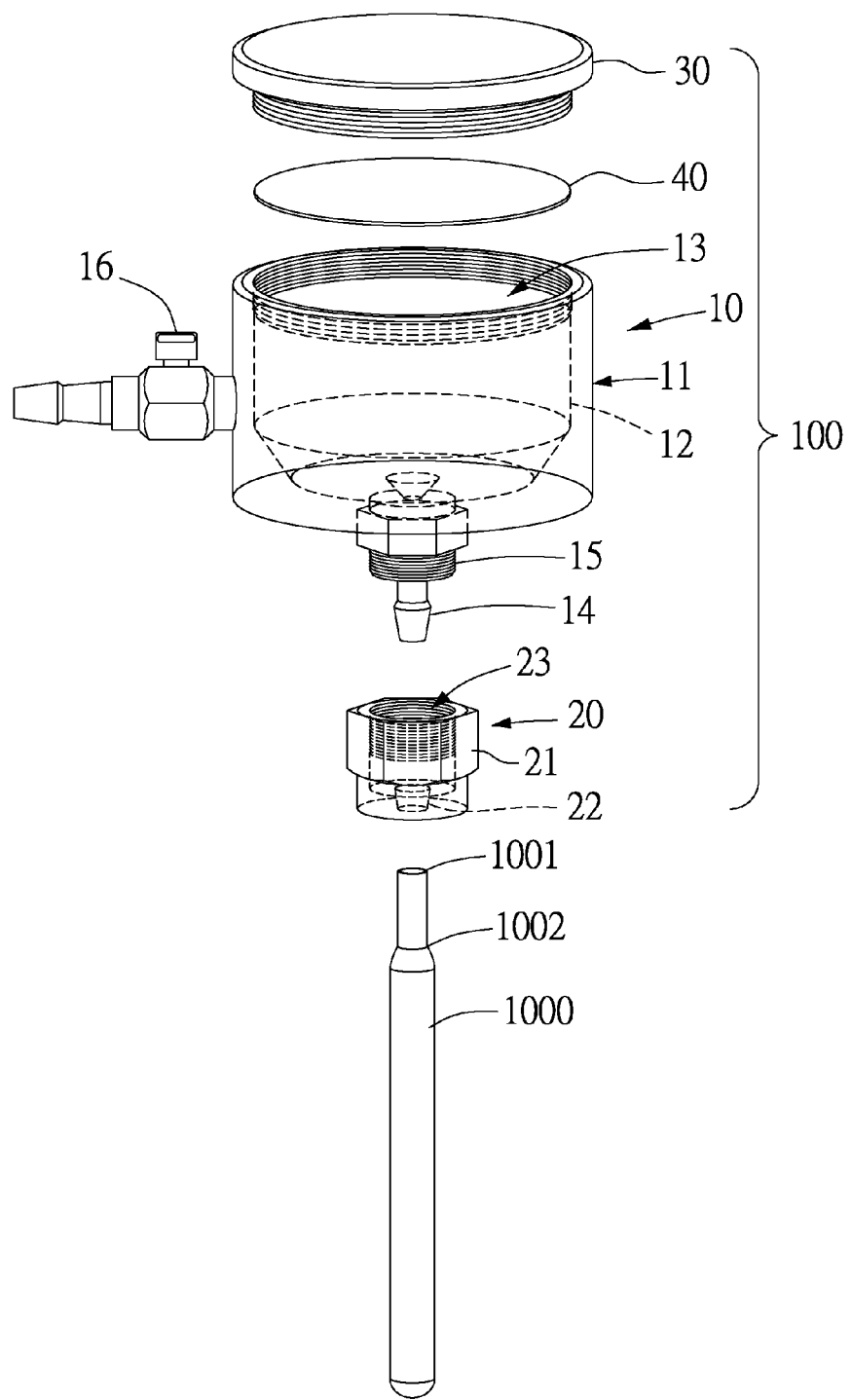
FIG. 1 is an exploded view of a filling pipe for use in high-temperature heat pipe filling operation according to the present invention.
Figure 2:
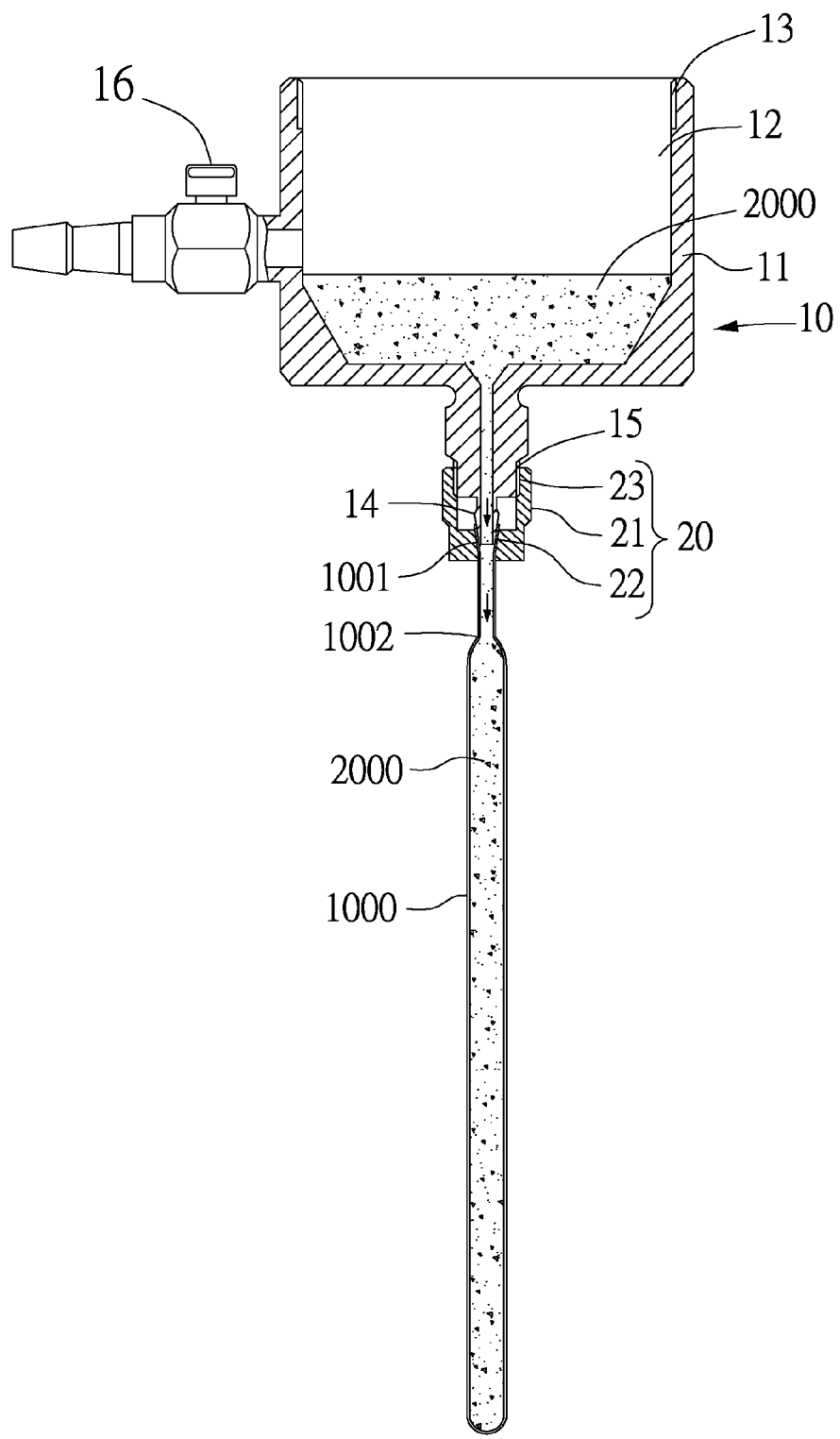
FIG. 2 is a cross-sectional view of the filling pipe being filled with alkali metals according to the present invention.
Figure 3:
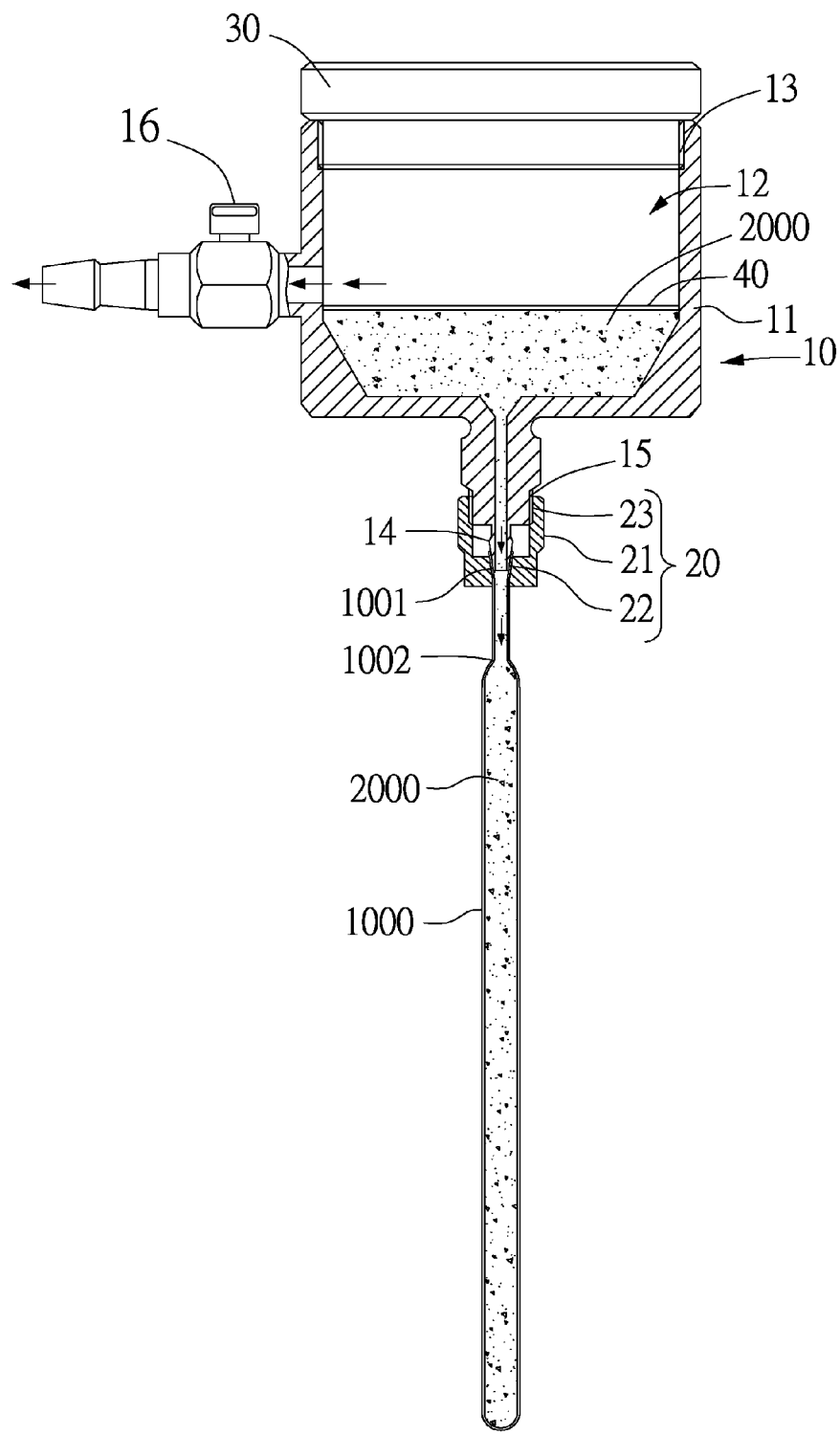
FIG. 3 is a cross-sectional view of the filling pipe being ready to create a vacuum therein according to the present invention.

FIG. 1 through FIG. 3 are described below. FIG. 1 is an exploded view of a filling pipe 100 for use in high-temperature heat pipe filling operation according to the present invention. FIG. 2 is a cross-sectional view of the filling pipe 100 being filled with alkali metals 2000 according to the present invention. FIG. 3 is a cross-sectional view of the filling pipe 100 being ready to create a vacuum therein according to the present invention. The filling pipe 100 fills the alkali metals 2000 into a metallic pipe 1000. One end of the metallic pipe 1000 has an opening 1001. The filling pipe 100 comprises an alkali metal filling unit 10, a metallic pipe fixing unit 20, a hermetic seal cover 30 and a stopping net 40.

Referring to FIG. 1 and FIG. 2, the alkali metal filling unit 10 has a filling body 11, a receiving space 12, a feed inlet 13, a feeding pipe 14, a first connecting portion 15 and a vacuum-generating component 16. The filling body 11 is made of stainless steel. The receiving space 12 is disposed in the filling body 11 and adapted to receive the alkali metals 2000. The feed inlet 13 is disposed at the top of the filling body 11 and in communication with the receiving space 12. The feeding pipe 14 is disposed at the bottom of the filling body 11 and in communication with the receiving space 12. The first connecting portion 15 is disposed at the bottom of the filling body 11 and, specifically speaking, around the feeding pipe 14. The vacuum-generating component 16 is disposed at the filling body 11 and in communication with the receiving space 12. Specifically speaking, the vacuum-generating component 16 is disposed on the sidewall of the filling body 11.

The metallic pipe fixing unit 20 has a fixing body 21, a taper opening 22 and a second connecting portion 23. The fixing body 21 is made of stainless steel. The taper opening 22 is disposed at the bottom of the fixing body 21. The second connecting portion 23 is disposed at the top of the fixing body 21 and connected to the first connecting portion 15.

Then, referring to FIG. 2 and FIG. 3, the way filling workers fill the alkali metals 2000 into the metallic pipe 1000 to manufacture a high-temperature heat pipe is described below.

First, the opening 1001 of the metallic pipe 1000 is inserted into the taper opening 22 of the metallic pipe fixing unit 20 to twist and compress the opening 1001 so that the opening 1001 deforms and becomes taper, thereby allowing the metallic pipe 1000 to be limited by the taper opening 22.

Then, the second connecting portion 23 of the metallic pipe fixing unit 20 and the first connecting portion 15 of the alkali metal filling unit 10 are connected to each other. Preferably, the first connecting portion 15 and the second connecting portion 23 are connected to each other by screwing. The feeding pipe 14 of the alkali metal filling unit 10 is inserted into the metallic pipe 1000 so that the opening of the feeding pipe 14 abuts against the opening 1001 of the metallic pipe 1000 to provide a hermetic seal therebetween.

Then, in an environment filled with argon gas, the alkali metals 2000 are passed through the feed inlet 13 to be placed in the receiving space 12. Then, the alkali metals 2000 are delivered from the receiving space 12 into the metallic pipe 1000 through the feeding pipe 14 until the metallic pipe 1000 is filled with the alkali metals 2000. The alkali metals 2000 are preferably metallic sodium.

Then, after the metallic pipe 1000 has been filled with the alkali metals 2000, the stopping net 40 is disposed in the receiving space 12 of the alkali metal filling unit 10 to prevent the alkali metals 2000 from moving.

Then, the feed inlet 13 of the alkali metal filling unit 10 is covered with the hermetic seal cover 30 by screwing the hermetic seal cover 30 to the feed inlet 13. At this point in time, the receiving space 12, the feeding pipe 14 and the metallic pipe 1000 together provide a hermetic seal and are each filled with the argon gas.

Then, the argon gas is discharged from the receiving space 12, the feeding pipe 14 and the metallic pipe 1000 by suction, using the vacuum-generating component 16, to create a vacuum. Upon the creation of the vacuum, the alkali metals 2000 cannot exit the metallic pipe 1000 and move upward to pass through the stopping net 40 to thereby enter the vacuum-generating component 16, because the stopping net 40 prevents the alkali metals 2000 from moving.

Then, after the receiving space 12, the feeding pipe 14 and the metallic pipe 1000 have jointly created the vacuum, a ball valve of the vacuum-generating component 16 is turned off, and the metallic pipe 1000 is clamped with a hydraulic clamp from below a severing point 1002.

Finally, the metallic pipe 1000 is severed at the severing point 1002 and then welded in order to manufacture a high-temperature heat pipe. Furthermore, it is necessary to remove a remaining portion of the metallic pipe 1000, which is otherwise confined to the taper opening 22. Therefore, the filling pipe 100 is reusable.

In conclusion, the present invention provides a filling pipe for use in high-temperature heat pipe filling operation to enable filling workers to fill solid alkali metals into a metallic pipe easily and safely in order to manufacture a high-temperature heat pipe.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:
1. A filling pipe for use in a high-temperature heat pipe comprising:
    an alkali metal filling unit for filling a plurality of alkali metals into a metallic pipe, having:
        a filling body;
        a receiving space disposed in the filling body;
        a feed inlet disposed at a top of the filling body and in communication with the receiving space;
        a feeding pipe disposed at a bottom of the filling body and in communication with the receiving space;
        a first connecting portion disposed at the bottom of the filling body; and
        a vacuum-generating component disposed at the filling body and in communication with the receiving space;
    a metallic pipe fixing unit, having:
        a fixing body;
        a taper opening disposed at a bottom of the fixing body and adapted to limit an opening end of the metallic pipe; and
        a second connecting portion disposed at a top of the fixing body and connected to the first connecting portion,
        wherein, when the first connecting portion gets connected to the second connecting portion, the feeding pipe of the alkali metal filling unit is inserted into an opening-disposed end of the metallic pipe;
    a hermetic seal cover separably covering the feed inlet of the alkali metal filling unit; and
    a stopping net movably disposed in the receiving space of the alkali metal filling unit.

2. The filling pipe of claim 1, wherein the first connecting portion and the second connecting portion are connected to each other by screwing.

3. The filling pipe of claim 2, wherein, when the feeding pipe of the alkali metal filling unit is inserted into the opening-disposed end of the metallic pipe, an opening of the feeding pipe fits an opening of the metallic pipe tightly.

4. The filling pipe of claim 1, wherein, when the feeding pipe of the alkali metal filling unit is inserted into the opening-disposed end of the metallic pipe, an opening of the feeding pipe fits the opening of the metallic pipe tightly.

5. The filling pipe of claim 1, wherein the hermetic seal cover separably covers the feed inlet of the alkali metal filling unit by screwing.

6. The filling pipe of claim 2, wherein the hermetic seal cover separably covers the feed inlet of the alkali metal filling unit by screwing.

7. The filling pipe of claim 3, wherein the hermetic seal cover separably covers the feed inlet of the alkali metal filling unit by screwing.

8. The filling pipe of claim 4, wherein the hermetic seal cover separably covers the feed inlet of the alkali metal filling unit by screwing.

9. The filling pipe of claim 1, wherein the alkali metals are metallic sodium.

10. The filling pipe of claim 2, wherein the alkali metals are metallic sodium.

11. The filling pipe of claim 3, wherein the alkali metals are metallic sodium.

12. The filling pipe of claim 4, wherein the alkali metals are metallic sodium.

* * * * *